Patented Dec. 30, 1952

2,623,883

UNITED STATES PATENT OFFICE 2,623,883

PROCESS FOR PRODUCING DIISOPROPYLIDENE GLYOXAL

Harold R. Hochstadt, Jackson Heights, N. Y., assignor to Evans Research & Development Corporation, New York, N. Y., a corporation of New York No Drawing. Application April 4, 1952, Serial No. 280,645

6 Claims. (Cl. 260—338)

This invention relates to a novel process for producing diisopropylidene glyoxal, hereinafter referred to as DIPG.

Objects and advantages of the invention will be set forth in part hereinafter and in part will be obvious herefrom, or may be learned by practice with the invention, the same being realized and attained by means of the processes and steps pointed out in the appended claims.

The invention consists in the novel processes herein shown and described.

An object of my invention is to provide a novel process for producing DIPG at higher yields than is presently obtained in any of the known processes.

Another object of my invention is to provide a novel process for producing DIPG in high yields in a reaction time that is economically feasible.

A further object is to provide a novel process for producing DIPG at high yields which is relatively simple in nature.

DIPG is a little known compound. The synthesis is reported only twice in the literature. H. O. L. Fischer and C. Taube, Berichte 59B: 851–6 (1926) mixed 43.6 g. glyoxal sulfate, 200 cc. acetone and 7.2 cc. water. After 36 hours at room temperature, a dark brown solution containing a rich mass of large crystals was obtained. After filtering, the crystals were washed with water, ether, alcohol and then ether to give nearly colorless crystals. The yield was 11.6 grams (60% of theory). Addition of water to the mother liquor gave a second crop.

The other synthesis, which was almost identical, was reported by H. Raudnitz, J. Chem. Soc., June 1948, 763–4. He left 20 g. glyoxal sulfate, 100 cc. acetone and 3 cc. water for two days. The yield was not reported.

The only other references to DIPG are Raudnitz, Chem. and Industry, 1944, pp. 327, 366, and Dyson, Chem. and Industry, 1944, p. 342. These articles deal with DIPG and the structure of glyoxal.

There was no use reported for DIPG until M. Berdick and myself invented a solid fuel unit for the Quartermaster Corps which contained DIPG as the major constituent. This invention is disclosed in U. S. patent application Serial No. 125,646, filed November 4, 1949.

The above described prior processes are not entirely suitable in that the reaction time is too long and yield too low for efficient, economical production. In order to overcome the disadvantages of the prior processes, I have invented a novel process for the production of DIPG using novel catalysts all of which contain either a bromine or chlorine atom. The invention in general consists of reacting glyoxal sulfate, acetone and water in the presence of specific chlorine containing and bromine containing catalysts to obtain DIPG in relatively high yields in a relatively short period of time.

Among the catalysts which are operable are the bromides and chlorides of the alkali metals as illustrated by lithium chloride, lithium bromide, sodium chloride, sodium bromide, potassium chloride and potassium bromide. The chlorides and bromides of the alkaline earth metals are also operable, as illustrated by magnesium chloride, magnesium bromide, calcium chloride, calcium bromide, barium chloride, barium bromide and strontium chloride. The following miscellaneous chlorides and bromides of no specific common classification are also operable, namely, aluminum, cerium, sulfur, selenium, cobalt and nickel. Hydrochloric acid, hydrobromic acid, ammonium chloride and ammonium bromide are also effective catalysts in the process of my invention.

Not all chlorides and bromides have catalytic properties in the process of this invention. For example, the following compounds have been tested and have been found to have no catalytic properties: cuprous chloride, zinc chloride, cadmium chloride, mercurous chloride, stannous chloride, lead chloride, antimony chloride, bismuth trichloride, manganous chloride and ferric chloride. Nor do the fluorides or iodides appear to have catalytic properties. Sodium fluoride does not exhibit catalytic properties as evidenced by actual tests and the same is true of hydriotic acid, ammonium iodide and sodium iodide.

The effective concentration of catalyst necessary will vary with each catalyst. It is preferable to use at least 0.1 mole of catalyst per mole of glyoxal sulfate to obtain advantageous high yields.

The process of this invention may be carried out at room temperature while higher temperatures may be used to speed up the time of reaction if so desired.

The theoretical formula for the reaction of the present process is as follows:

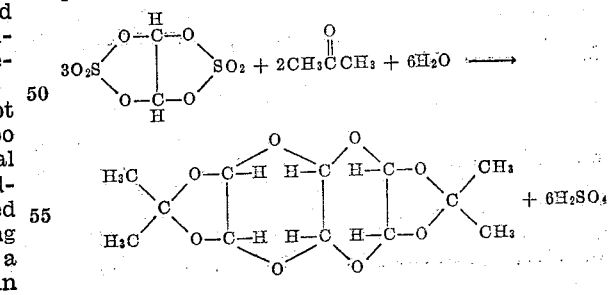

It is necessary to use the acetone in excess since it acts as a solvent for the other reactants as well as a reactant. The reaction also proceeds more advantageously if an excess of water is used. It is not necessary, however, that the water be in excess as in the case of the acetone.

In order to illustrate the invention more specifically the following working examples are given:

Example I 54.5 grams of glyoxal sulfate is added to a solution consisting of 86.9 grams acetone and 15.5 grams water. Concentrated hydrochloride acid, 6.6 grams, is added. The solution is stirred for 6 hours, maintaining the temperature at 28° C. The crude diisopropylidene glyoxal is removed by filtration and is washed with water. After recrystallization from acetone or ethylene dichloride, 18.4 grams of DIPG (76% yield based on glyoxal sulfate) is obtained as white leaflets which melt at 206–7° C.

Example II 4 grams of sodium chloride is added to a solution of 54.5 grams glyoxal sulfate in 86.9 grams acetone and 18 grams water. The solution is stirred for 6 hours at 28° C. The crude diisopropylidene glyoxal is separated by filtration, washed with water and recrystallized. The yield is 17.9 grams (74%).

Example III 6.7 grams of ammonium bromide is added to a solution of 54.5 grams of glyoxal sulfate in 86.9 grams acetone and 18 grams water. The solution is stirred for 6 hours at 28° C. The crude diisopropylidene glyoxal is separated by filtration, washed with water and recrystallized from ethylene dichloride. The yield is 18.8 grams (78.1%).

Example IV 3.8 grams of calcium chloride is added to a solution of 54.5 grams glyoxal sulfate in 86.9 grams acetone and 18 grams water. The solution is stirred for 6 hours at 28° C. The precipitate is separated by filtration and is recrystallized from ethylene dichloride or acetone. The yield of white platelets of diisopropylidene glyoxal, melting at 204–207° C. is 18.1 grams (75%).

Example V 4.5 grams of aluminum chloride is added to a solution of 54.5 grams glyoxal sulfate in 86.9 grams acetone and 18 grams water. The solution is stirred for 6 hours at 28° C. The crude product is separated by filtration and is recrystallized. The yield of diisopropylidene glyoxal after recrystallization is 17.1 grams (71.5%).

Example VI 9.2 grams of sulfur monochloride is added to a solution of 54.5 grams glyoxal sulfate in 86.9 grams acetone and 18 grams water. The solution is stirred for 6 hours at 28° C. The crude product is separated and is recrystallized. The yield of diisopropylidene glyoxal after recrystallization is 20.2 grams (84.2%).

Example VII 15.8 grams of cobaltous chloride hexahydrate is added to a solution of 54.5 grams glyoxal sulfate in 86.9 grams acetone and 18 grams water. The solution is stirred for 6 hours at 28° C. The crude product is filtered and recrystallized. The yield of diisopropylidene glyoxal is 19.7 grams (82%).

Example VIII 3.2 grams of sodium chloride was added to a solution of 43.6 grams of glyoxal sulfate in 158 grams acetone and 7.2 grams water. The solution was stirred at room temperature (20–24° C.) for 36 hours. The dark brown solution was filtered. After filtering, the crystals were washed with water and recrystallized from ethylene dichloride. The yield of diisopropylidene glyoxal was 13.2 grams (71.2%).

Example IX 6.0 grams of concentrated hydrochloric acid solution was added to a solution of 54.5 grams of glyoxal sulfate in 89 grams of acetone and 20 grams water. The solution was stirred for 6 hours, maintaining the temperature at 28° C. The crude diisopropylidene glyoxal was removed by filtration and recrystallized from ethylene dichloride. The yield was 17.6 grams (73.4%).

Example X 6.0 grams of concentrated hydrochloric acid solution was added to a solution of 54.5 grams glyoxal sulfate in 86.9 grams acetone and 15.5 grams water. The solution heated to 36° C. for 3 hours. The reaction was cooled and filtered. The crude product was recrystallized from ethylene dichloride to give 17.4 grams (72.5% yield) of white leaflets which melted at 204–6° C.

The following table is illustrated to illustrate the improved results obtained in my process where specific catalysts are used as compared to a process where no catalyst is used:

Table

| Catalyst | Moles catalyst/mole Glyoxal Sulfate | Percent yield DIPG (after Recrystallization) |
|---|---|---|
| Hydrochloric acid | 0.27 | 73–77 |
| Hydrobromic acid | 0.27 | 73.3 |
| Ammonium chloride | 0.27 | 71–72 |
| Ammonium bromide | 0.27 | 78.1 |
| Group I: | | |
| Lithium chloride | 0.54 | 75.0 |
| Do | 0.27 | 69.3 |
| Sodium chloride | 0.27 | [1] 70–80 |
| Sodium bromide | 0.27 | 70.80 |
| Potassium chloride | 0.27 | 74.8 |
| Potassium bromide | 0.14 | 79.6 |
| Group II: | | |
| Magnesium chloride | 0.14 | 72.1 |
| Magnesium bromide | 0.27 | 70 |
| Calcium chloride | 0.27 | 72 |
| Do | 0.14 | 71–81 |
| Calcium bromide | 0.27 | 88.7 |
| Barium chloride | 0.27 | 74.3 |
| Strontium chloride | 0.27 | 80.0 |
| Group III: | | |
| Aluminum chloride | 0.136 | 71.5 |
| Do | 0.096 | 66.6 |
| Aluminum bromide | 0.27 | 71.2 |
| Group IIIb—Ceric chloride | 0.27 | 85.4 |
| Group VIb: | | |
| Selenium bromide | 0.07 | 70 |
| Sulfur monochloride | 0.27 | 84.2 |
| Group VIII: | | |
| Cobaltous chloride | 0.27 | 76–82 |
| Cobaltous bromide | 0.27 | 70.0 |
| Nickelous bromide | 0.27 | 77.9 |
| Control—No catalyst | | 41–50 |

[1] Average 75.

A study of the above table shows some very interesting results. It is noted that the above yields were obtained in six hours using a temperature of 28 to 30° C. The short time required to obtain such high yields makes the process of my invention a most desirable one. I have obtained sufficiently high yields in even less time if the temperature of the reaction is increased accordingly.

As shown in table, yields from 41 to 50% have been obtained where no catalyst is used. Yields as high as 88.7 of the theoretical yields have been obtained by using my process. In all cases, as can be readily observed from the above table, substantial increases of yield are obtained when my process is used. It is evident, therefore, that my process is a decided advance in the art over the prior processes which were economically unattractive due to its low yields and long reaction time.

The invention in its broader aspects is not limited to the specific processes described but departures may be made therefrom within the scope of the accompanying claims without departing from the principles of the invention and without sacrificing its chief advantages.

I claim:

1. A process for the production of diisopropylidene glyoxal comprising reacting glyoxal sulfate, acetone and water in the presence of a catalyst selected from the group consisting of lithium chloride, lithium bromide, potassium bromide, potassium chloride, sodium bromide, sodium chloride, magnesium chloride, magnesium bromide, calcium chloride, calcium bromide, barium chloride, barium bromide, strontium chloride, aluminum chloride, aluminum bromide, cerium chloride, cerium bromide, sulfur monochloride, sulfur monobromide, selenium bromide, selenium chloride, cobaltous chloride, cobaltous bromide, nickelous chloride, nickelous bromide, hydrochloric acid, hydrobromic acid, ammonium chloride and ammonium bromide.

2. A process as defined in claim 1 in which the catalyst is hydrochloric acid.

3. A process as defined in claim 1 in which the catalyst is ammonium chloride.

4. A process as defined in claim 1 in which the catalyst is calcium chloride.

5. A process as defined in claim 1 in which the catalyst is sodium chloride.

6. A process as defined in claim 1 in which the catalyst is cobaltous chloride.

HAROLD R. HOCHSTADT.

No references cited.